(12) United States Patent　　　　　　(10) Patent No.:　US 12,607,533 B2

Murphy　　　　　　　　　　　　　　(45) Date of Patent:　　Apr. 21, 2026

---

(54) HVAC PROBE DIAGNOSTIC GAUGE

(71) Applicant: Paul Murphy, Fresno, CA (US)

(72) Inventor: Paul Murphy, Fresno, CA (US)

( * ) Notice: Subject to any disclaimer, the term of this patent is extended or adjusted under 35 U.S.C. 154(b) by 360 days.

(21) Appl. No.: 18/408,931

(22) Filed: Jan. 10, 2024

(65) Prior Publication Data

US 2025/0224297 A1　　　Jul. 10, 2025

(51) Int. Cl.
| | |
|---|---|
| *G01L 19/16* | (2006.01) |
| *F25B 45/00* | (2006.01) |
| *G01L 19/00* | (2006.01) |

(52) U.S. Cl.
CPC .............. *G01L 19/16* (2013.01); *F25B 45/00* (2013.01); *G01L 19/0007* (2013.01)

(58) Field of Classification Search
CPC ......................................................... G01L 19/16
See application file for complete search history.

(56) References Cited

U.S. PATENT DOCUMENTS

| | | | | | |
|---|---|---|---|---|---|
| 2,128,265 | A | * | 8/1938 | Pechy | G01L 19/0007 |
| | | | | | 138/40 |
| 2,635,623 | A | * | 4/1953 | Moffett | B60S 5/043 |
| | | | | | 137/625.5 |
| 3,336,937 | A | * | 8/1967 | Ehrens | F25B 45/00 |
| | | | | | 408/97 |
| 3,450,149 | A | * | 6/1969 | Brinda | F25B 45/00 |
| | | | | | 251/146 |

| | | | | | |
|---|---|---|---|---|---|
| 3,648,725 | A | * | 3/1972 | Strybel | F16K 13/04 |
| | | | | | 285/197 |
| 3,916,641 | A | * | 11/1975 | Mullins | F25B 45/00 |
| | | | | | 62/77 |
| 5,396,774 | A | * | 3/1995 | Hubbell, Jr. | F25B 45/00 |
| | | | | | 62/77 |
| 5,786,538 | A | * | 7/1998 | Barone | F01P 3/205 |
| | | | | | 73/714 |
| 11,143,445 | B2 | * | 10/2021 | Pearl | F16L 55/07 |
| 2021/0010731 | A1 | * | 1/2021 | Cruz | F25B 45/00 |
| 2024/0085055 | A1 | * | 3/2024 | Karamanos | F24F 1/0063 |

FOREIGN PATENT DOCUMENTS

| | | | | |
|---|---|---|---|---|
| EP | 0794418 B1 | * | 5/1998 | ......... G01L 19/0609 |

* cited by examiner

*Primary Examiner* — Herbert K Roberts
(74) *Attorney, Agent, or Firm* — Lyman Moulton, Esq.; Moulton Patents, PLLC

(57)　　　　　　　ABSTRACT

The disclosure allows technicians to remove contaminants during the installation and maintenance process, preventing refrigerant loss and contamination entry into the HVAC system. Ingenious and practical this unprecedented device is uniquely designed with durable, high-quality materials to ensure long-term sustainability. This product offers removable/replaceable parts for speedy maintenance and was engineered by an HVAC technician, possessing years of experience. A gauge device comprising an intake stem comprising an intake end, a bleed end and a fluid flow there between and a gauge access in a side there between. The disclosure also includes a split valve received into the intake stem to control the fluid flow through the intake stem, a gate valve including an aperture adjacent the gauge access to control the aperture via a control arm and a gauge received in the gauge access and to take measurements of the intake stem via the aperture.

16 Claims, 2 Drawing Sheets

HVAC PROBE DIAGNOSTIC GAUGE

BACKGROUND

The process of HVAC (heating, ventilation and air conditioning) installations and maintenance often leaves the unit vulnerable to refrigerant loss and contaminants, such as: dust, debris, or microbial agents, which infiltrate the system. These common elements not only cause havoc to the effectiveness of the system, but may be the root cause of time-consuming, tedious, and costly repairs. There have been no products available as original equipment or as an aftermarket to address this problem.

An apparatus that protects the HVAC from being vulnerable to refrigerant loss and contaminants, such as: dust, debris, or microbial agents from infiltrating the system is not being met by any known device or system at present. There have been no products available as original equipment or as an aftermarket to address this problem either.

SUMMARY OF THE INVENTION

The main purpose of the HVAC Probe Diagnostic Gauge is to provide users with a device that prevents refrigerant loss and contaminant settling during HVAC installments and maintenance.

A gauge device comprising an intake stem comprising an intake end, a bleed end and a fluid flow there between and a gauge access in a side there between. The disclosure also includes a split valve received into the intake stem and configured to control the fluid flow through the intake stem, a gate valve comprising an aperture adjacent the gauge access and configured to control the aperture via a control arm and a gauge received in the gauge access and configured to take measurements of the intake stem via the aperture.

Figure 1:
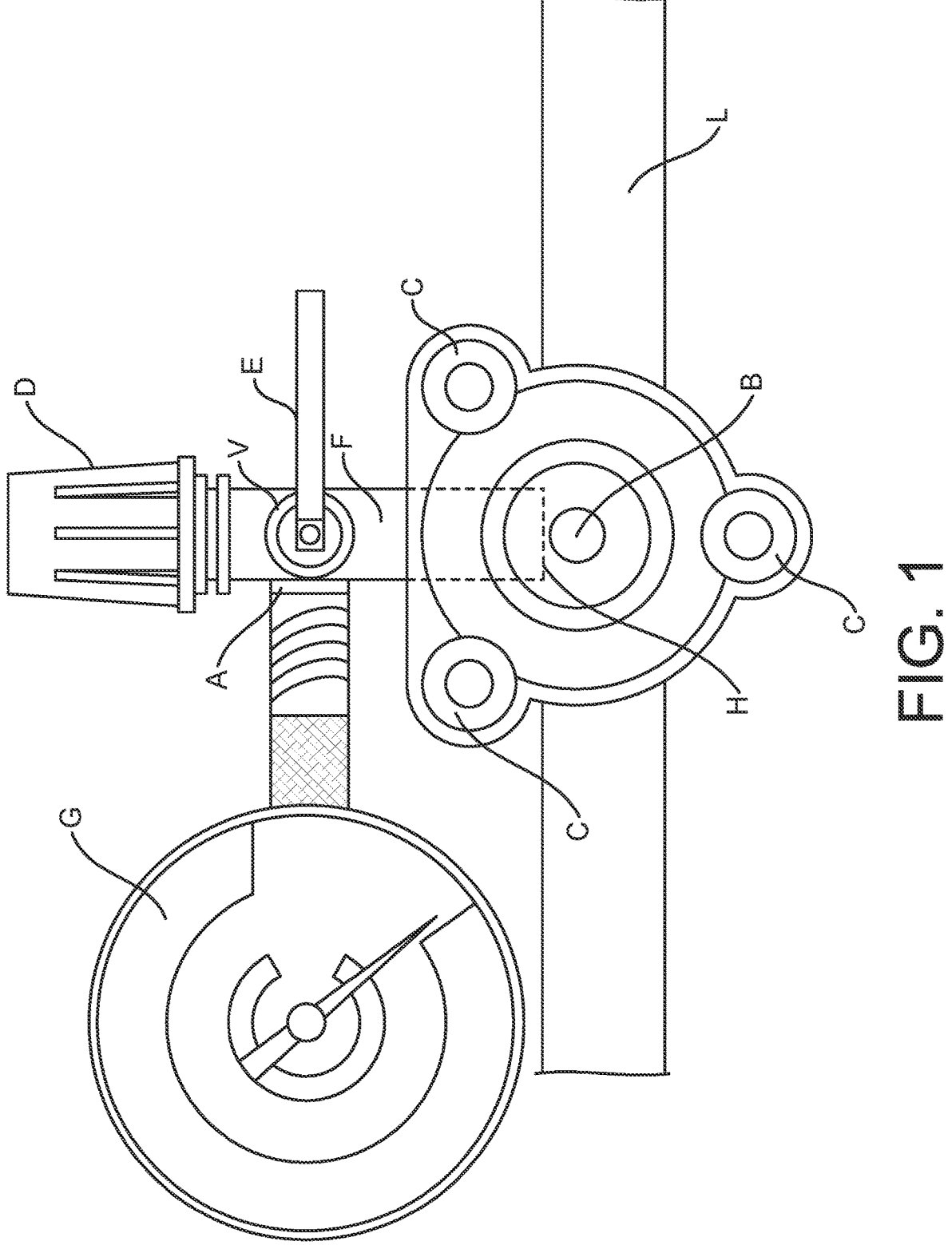
FIG. 1 is a side view of the HVAC Probe Diagnostic Gauge clamped onto an HVAC line in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

FIG. 1 is a side view of the HVAC Prove Diagnostic Gauge clamped on an HVAC line showing: copper line referenced as L, the aperture A, piercing point referenced as B, screw-on-clamp with gasket referenced as C, gauge referenced as D, control arm E for a gate valve, split valve referenced as F, removable/replaceable gauge referenced as G, in accordance with an embodiment 60 of the present disclosure. The gate valve includes a sliding part that controls the intake of a HVAC fluid into the aperture H. The stem F houses a split valve comprising a body and a ball joined together therein. When the stem F is turned, the ball inside either blocks or allows the flow of the HVAC fluid to pass through to the gate valve E and into the aperture A and out the bleed D or blocks it from flowing. As the clamps C are tightened onto the line L, the piercing point B pierces and enters the line L and self seals against the line L. The gate valve V is controlled by moving the control arm E in an arc motion around the center of the valve. The bleed D is controlled by turning the bleed cap in a clockwise motion to open the bleed and in a counterclockwise motion to close the bleed. The bleed D allows a bleeding of air in the intake until the HVAC fluid reaches the gauge for a pressure and flow measurement. The gate valve protects the gauge by allowing a predetermined flow through the intake to be measured by the gauge.

Figure 2:
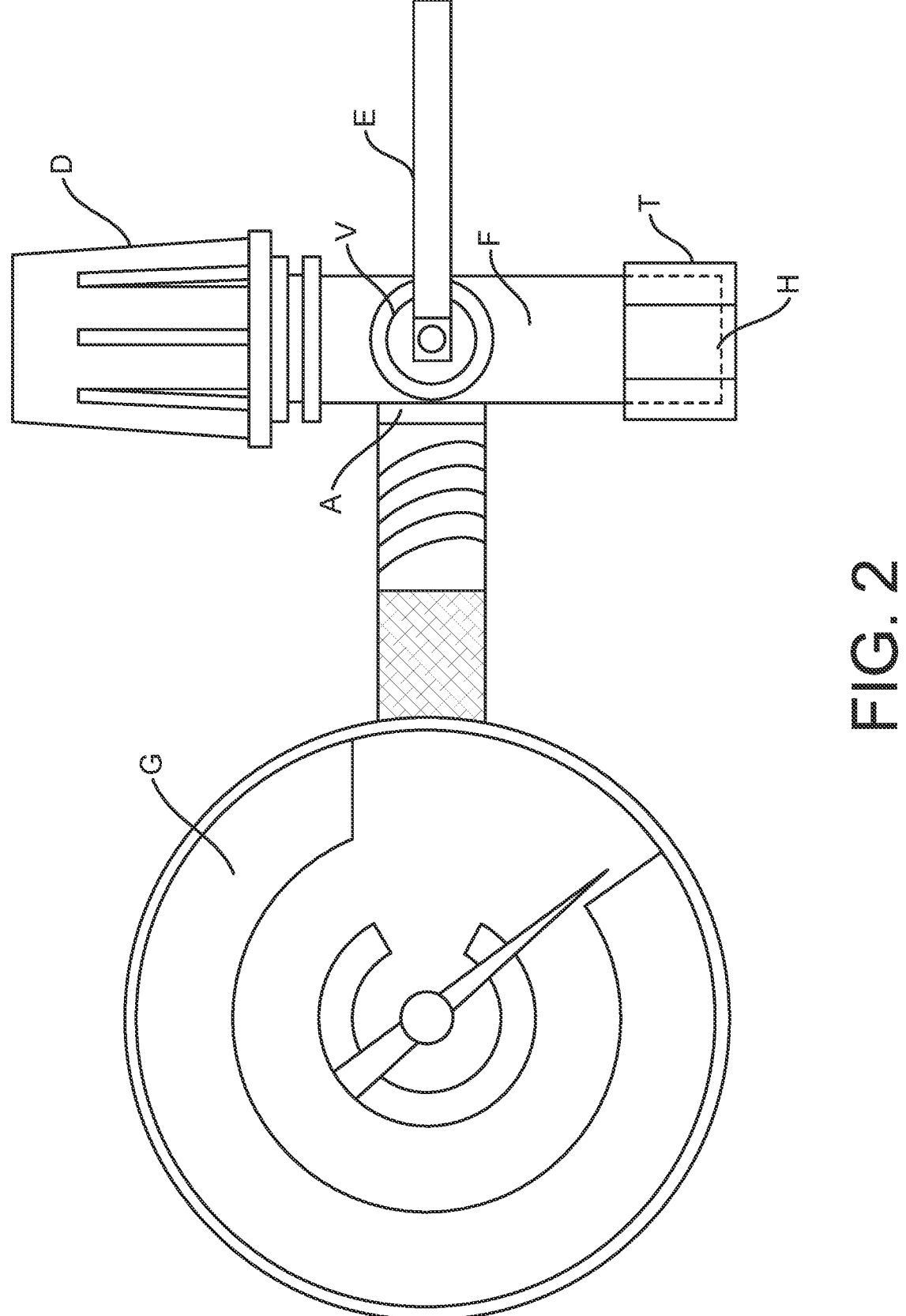
FIG. 2 is a side view of the HVAC Probe Diagnostic Gauge with its intake a screw on adapter in accordance with an embodiment of the present disclosure.

FIG. 2 is a side view of the HVAC Probe Diagnostic Gauge with its intake capped off and showing: aperture A, gauge referenced as D, gate valve V and control aem E, split valve referenced as F, removable/replaceable gauge referenced as G, and intake H in accordance with an embodiment of the present disclosure. The view also includes the intake screw adapter T for connecting to hvac equipment service ports.

The present disclosed HVAC Probe Diagnostic Gauge, also known as "HVAC Product", offers an accessory that allows technicians to access critical points within the HVAC system enabling them to remove potential contaminants effectively; thus, maintaining superior indoor air quality as the system operates at optimal performance levels. The disclosure introduces a novel tool that combines probes, hoses, and gauges to provide a comprehensive solution for managing circulation appliances. The device's integrated gauges provide HVAC professionals with accurate measurements of key parameters, assessing pressure, temperature and airflow. By closely monitoring these metrics during the installation process, technicians can identify anomalies that may lead to contamination. The device's flexible hoses and probes allow technicians to reach even the most challenging areas ensuring comprehensive contamination prevention. With the HVAC Product, HVAC professionals can execute their tasks with precision and efficiency, saving time and delivering exceptional results.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

What is claimed is:
1. A gauge device comprising:
an intake stem comprising an intake end, a bleed end and a fluid flow there between and a gauge access in a side there between;
a split valve received into the intake stem and configured to control the fluid flow through the intake stem, wherein the split valve is configured to control the fluid flow by a ball turning in the split valve relative to the intake stem;

a gate valve comprising an aperture adjacent the gauge access and configured to control the aperture via a control arm;

a gauge received in the gauge access and configured to take measurements of the intake stem via the aperture; and a bleed cap configured to turn and allow an air to escape through the bleed end and bleed the fluid flow through the intake stem.

2. The gauge device of claim 1, further comprising a clamp configured to house a piercing point in connection with the intake end and configured to probe an HVAC line for the fluid flow.

3. The gauge device of claim 2, wherein the clamp further comprises three pairs of tightening jaws.

4. The gauge device of claim 2, wherein the piercing point is disposed in a center of the clamp.

5. The gauge device of claim 2, wherein the connection between the piercing point and the intake end is a fluidic connection.

6. The gauge device of claim 1, further comprising a cap for the intake end.

7. The gauge device of claim 1, wherein the bleed cap is a fluted bleed cap.

8. The gauge device of claim 1, wherein the gate valve further comprises a control arm configured to control the gate valve by moving in an arc motion around a center of the gate valve.

9. The gauge device of claim 1, wherein the gate valve is configured to enable a fluid pressure measurement from the gauge across the aperture.

10. The gauge device of claim 1, wherein the gate valve is configured to enable a fluid flow measurement from the gauge across the aperture.

11. The gauge device of claim 1, wherein the gauge takes measurements indicative of an HVAC fluid line in fluidic communication with the intake stem.

12. The gauge device of claim 1, wherein the intake end of the intake stem is configured to pierce an HVAC fluid line for measuring a fluid pressure and a fluid flow therein.

13. The gauge device of claim 1, wherein the gauge is removable from the gauge access for replacement and for maintenance.

14. The gauge device of claim 1, wherein the split valve is configured to protect the gauge by isolating it from a fluid pressure in the intake stem.

15. The gauge device of claim 1, wherein the gate valve is configured to protect the gauge by a closure thereof.

16. The gauge device of claim 1, wherein the gate valve is configured to enable the gauge by an opening thereof.

* * * * *